Oct. 25, 1938.　　　C. A. WINSLOW　　　2,134,385
FILTER MECHANISM
Filed Oct. 7, 1935　　　2 Sheets-Sheet 1
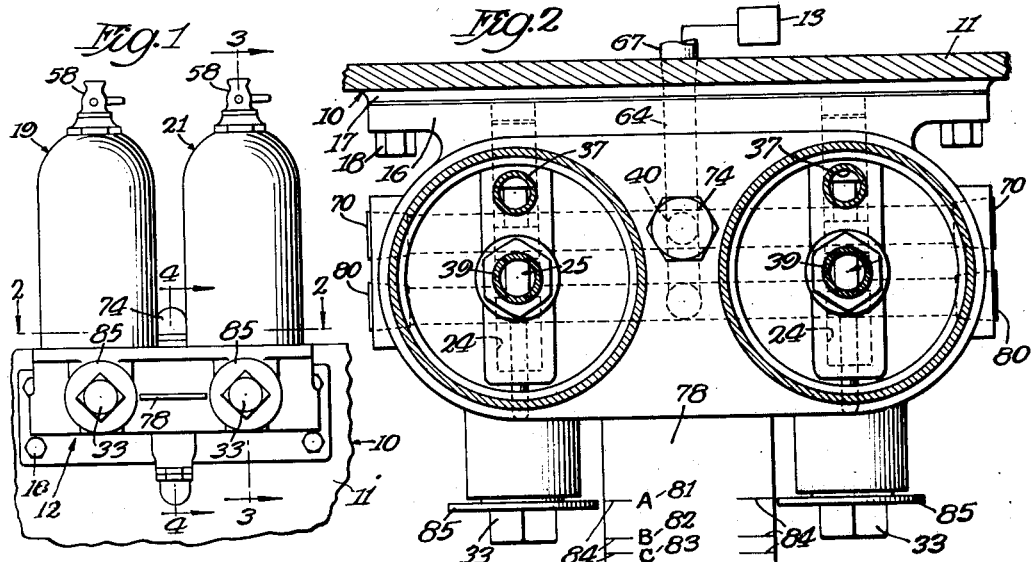
Inventor:
Charles A. Winslow
By Gillson, Mann &c.
Attys.

Oct. 25, 1938.   C. A. WINSLOW   2,134,385
FILTER MECHANISM
Filed Oct. 7, 1935   2 Sheets-Sheet 2
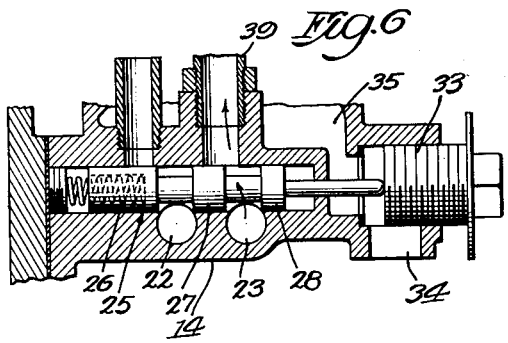
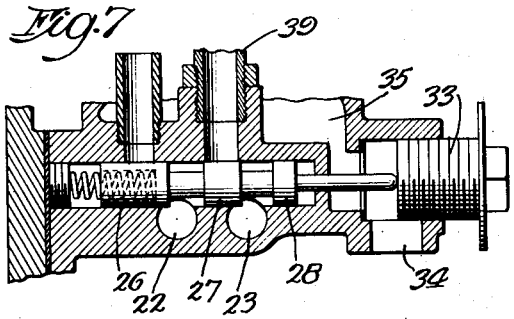
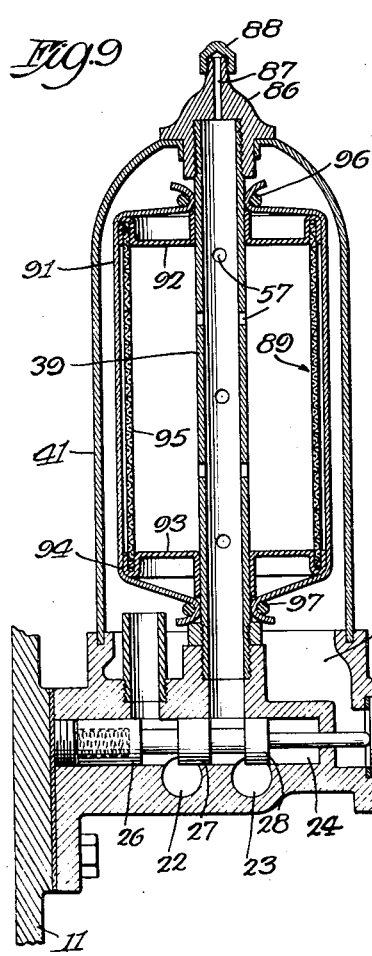
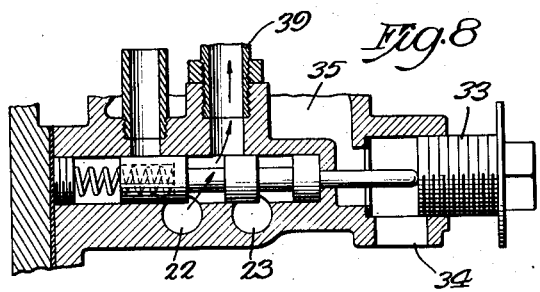
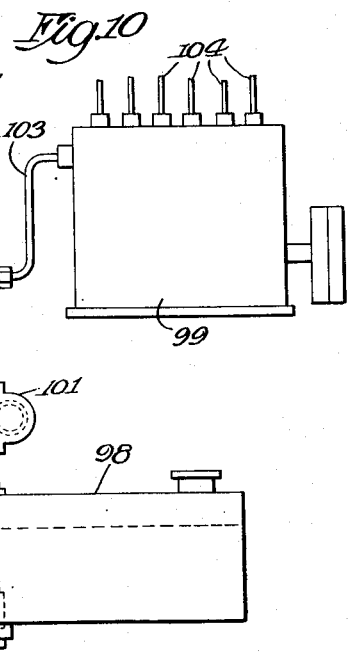
Inventor:
Charles A. Winslow Patented Oct. 25, 1938

2,134,385

UNITED STATES PATENT OFFICE 2,134,385

FILTER MECHANISM

Charles A. Winslow, Oakland, Calif.

Application October 7, 1935, Serial No. 43,827

6 Claims. (Cl. 210—133)

This invention relates to fuel and oil filters for internal combustion engines and the like.

One of the objects of the invention is the provision of new and improved means for filtering fuel and oil for internal combustion engines and providing novel means for cleaning the filters without the necessity of stopping the engine during the cleaning operation.

A further object of the invention is the provision of new and improved means for cleaning the filters and for restoring them to normal operating condition during the operation of the engine.

A further object of the invention is the provision of novel filter mechanism having new and improved means for opening the filter casing to the atmosphere during the cleaning and initial operations of the filter together with novel means for trapping a predetermined amount of air within the casing for cushioning the impulses or hammering of the liquid within the system when the filter is used in connection with a mechanism for causing intermittent movement of the liquid through the filter, as, for instance, in filtering the fuel in connection with a Diesel type of engine.

A further object of the invention is the provision of a new and improved oil or fuel filter that is inexpensive to manufacture, easily cleaned, efficient in operation, which will not have its efficiency impaired by trapped air within the filter casing but will trap sufficient air to cushion the impulses or hammer within the system when used as a fuel filter for Diesel engines and the like.

Other and further objects and advantages will appear from the following description, taken in connection with the accompanying drawings, in which:

Fig. 1 is a side elevation of a portion of an internal combustion engine showing the invention in position thereon and with parts broken away;

Fig. 2 is a plan view of the structure shown in Fig. 1;

Fig. 3 is a section on the line 3—3 of Fig. 1;

Fig. 4 is a section on the line 4—4 of Fig. 1;

Fig. 5 is a section on the line 5—5 of Fig. 3;

Figs. 6, 7 and 8 are views similar to Fig. 3 with the filter element and case removable and showing the plunger in three different positions, respectively.

Fig. 9 is a section similar to Fig. 3 but showing a modified form of filter element; and Fig. 10 is a diagrammatic showing of a fuel filter to be used on a Diesel engine.

Referring now to the drawings, the reference character 10 designates generally an internal combustion engine having the crank case 11 to which is rigidly attached the filter 12. When the filter is used for the purpose of filtering the lubricating oil, the pump 13, shown more or less diagrammatically in Fig. 4, is employed for supplying the oil from the crank case to the filter mechanism where it is filtered and supplied to the bearings of the engine.

In filtering oil for bearings for an internal combustion engine, the filter element will sometimes become clogged by the collection of foreign matter screened from the oil as it passes through the filter material. If a plurality of units be used instead of one, there is less likelihood of all the units becoming clogged simultaneously than where one alone is employed. It is desirable that means be provided whereby the filter element may be cleaned during the operation of the engine. Where a plurality of filter elements are used, this may be done by cleaning one of the units while the other, or others, continue to operate.

The cleaning of the filter elements for a lubricating system of internal combustion engines may be accomplished by a simple reversal of the flow of the lubricant through the unit and the simultaneous removal of the oil and sludge from the unit. It is preferable, however, where the oil has become contaminated more or less by use, to provide means whereby only filtered oil will be supplied to the interior of the filter during this reverse flow, as otherwise foreign matter in the unfiltered oil will collect on the inner side of the filter element and be supplied to the bearings when the filter resumes its normal operation.

The present invention seeks to provide means whereby filtered oil will be continually supplied to the bearings while the engine is in operation, and at the same time permitting the filters to be cleaned with either filtered or unfiltered oil during this operation.

In the form of the device selected to illustrate one embodiment of the invention, the filter comprises a filter block 14 having a base 15 provided with an attaching flange 16 whereby the block may be attached to a pad 17 (see Figs. 3 and 4) integral with the side wall of the crank case 11, as by means of the screws or other fastening means 18.

A plurality of filter units are provided for each filter block; in the form of the device shown— which is by way of example only—two filter units 19 and 21 are employed, and these units are mounted on the filter block 14, extending upwardly from the same.

The filter block 14 is provided with a main filter intake passage 22 and a main filter discharge passage 23 extending longitudinally of the block beneath the filter units 19 and 21.

Beneath each filter unit the block 14 is provided with a bore 24 which intercepts the passages 22 and 23, and within this bore is slidably mounted a valve 25 having inner, intermediate and outer enlarged cylindrical portions 26, 27 and 28, respectively, thereon, for controlling the flow of fluid to be filtered through said passages.

The inner enlarged portion 26 of the valve member 25 is provided with a cylindrical recess in which is mounted a spring 29 which reacts against a screw threaded plug 30 which closes the inner end of the bore 24. The compression of the spring may be adjusted by this plug. This spring tends to hold the valve member in its outermost position. The outer end of the valve member is provided with a stem 32 which extends through the outer wall 31 of the bore 24 and is adapted to engage a screw threaded plug 33 which closes the sump discharge opening 34 of a sump cavity 35 beneath the filter unit in the upper portion of the filter block 14. The bore 24 extends across the main intake and discharge passages 22 and 23, respectively, as clearly shown in Figs. 3, 6, 7 and 8 of the drawings.

The block is also provided with an upwardly extending filter intake passage 36 above the bore 24 and in the upper end of which an upwardly extending short tube 37 is secured. The tube 37 extends upwardly through the sump cavity 35 and terminates at a point above said cavity. An upwardly extending discharge passage 38 is provided in the block 14 above the bore 24. The passages 36 and 38 are in communication with the bore 24 during the normal operation of the filter. The intake passages 22 and 36 may be considered the filter intake passage for the corresponding unit and passages 38 and 23 the discharge passage therefor.

Since the filter units 19 and 21 are identical, only one need be described in detail. Each of these units comprises a casing 41 which in the form of the construction shown is dome-shaped and has its lower edge seated in a groove in the top portion of the wall 42 surrounding the sump cavity 35. The casing 41 is held in position within the groove by means of a tube 39, the lower end of which is screw threaded in the upper end of the discharge passage 38. The upper end of this tube has a cap nut 43 threaded thereon which engages the upper end of the tube. The cap nut 43 is provided with a reduced portion 44 which extends through an axial opening in the upper end of the casing and the body portion of the nut has flat faces which may be engaged by a wrench for clamping the casing in position on the filter block.

A filter unit is provided within the casing and surrounds the tube 39. Any suitable filter element 30 may be employed for this purpose. In the form shown, this element comprises an outer wall 45 of reticulated or foraminous material and an inner wall 46 of similar material. These walls are connected together at their upper ends by a cap member 47 and at their lower ends by a cap member 48. Suitable filter material, as animal or mineral wool 49, occupies the space between the inner and outer walls of the filter element.

The filter element is held in lowered position seated against a pad 51 by a spring 54 surrounding the upper end of the tube 39. The pad 51 is supported by a washer 52 seated on a nut 53 on the lower end of the tube. The spring seats against a cap 44 at its upper end and engages a washer 55 at its lower end which in turn engages a pad 56 seated on the upper end of the filter element. The pads 51 and 56 are clamped against the ends of the caps 47 and 48 for preventing the entrance of unfiltered oil into the space surrounding the tube 39 between the pads. The tube 39 is provided with a plurality of radial openings 57 through which oil passing through the filter element is discharged from the filter unit.

Suitable means are provided for permitting the escape of excess or superfluous air trapped in the casing 41 when oil is introduced into an empty unit. It is desirable, however, that a predetermined amount of air be trapped in the upper portion of the unit, especially when the filter is used in connection with a Diesel engine, for the purpose of forming a cushion against "hammering", as will presently appear. In the form of the construction shown, the means for permitting the escape of superfluous air and for retaining a predetermined amount of air to form a cushion comprises a nozzle member 58 secured in the cap nut 43 and having a small bore 59 extending axially thereof and across which a valve 61 having a handle 60 extends for closing the passage 59. The cap and nozzle may, if desired, be unitary. The valve comprises a cylindrical member 62 having a transverse opening 63 which may be turned into alignment with the passage 59 for permitting the escape of air, as the dome fills with oil, and which may be turned at right angles, as shown in Fig. 3, for closing said passage. The opening of this valve facilitates the escape of oil or other liquid from the casing during the cleaning of the unit by permitting air to enter above the liquid.

The intake and discharge passages 22 and 23 may, and preferably do, extend entirely through the filter block 14 whereby the discharge from the pump and the conduit leading to the bearings, if located exterior of the crank case, may be connected with these passages. These passages are closed at their ends by suitable plugs 79 and 80 (see Fig. 2).

If the filter is used for filtering the fuel, the conduits leading from the fuel tank to the filter and from the filter to the fuel distributor may be connected to the outer ends of these passages. In the construction shown in Figs. 1 to 9 of the drawings, however, the filter block is connected to the crank case and the conduits leading to and from the filter units are provided within the block and within the crank case whereby they are protected. This may be accomplished in numerous ways, but in the form of the construction selected to illustrate an embodiment of the invention, the filter block is provided with transverse bores or conduits 64 and 65 arranged between the units (see Figs. 2 and 4). The bore or conduit 64 is in communication with the discharge conduit 23. At its inner end the conduit 65 aligns with an opening through the crank case in which the discharge conduit 66 from the pump 13 is connected. The inner end of the discharge conduit 64 is in alignment with an opening in the crank case 11 in which is secured the outer end of the conduit 67 which conducts the oil to the crank shaft and other bearings in the usual manner.

When the oil is of such consistency that it will not readily pass through the filters, as in starting the engine in cold weather or when the filter element becomes clogged, it is desirable that the oil from the pump by-pass the filter while those conditions obtain. As shown, this is accomplished by providing a bore 40 extending vertically through the block 14, the central portion of which is restricted in diameter and constitutes a by-pass 68 between the conduits 64 and 65, as shown more clearly in Fig. 4 of the drawings. A ball valve 69 is provided for closing the by-pass 68. This valve is held seated by a suitable spring 71 which abuts against a plug 72 adjustably held in one end of the bore 40 of the filter block by a set nut 73 and a cap nut 74. The compression of the spring may be adjusted so that under normal operating conditions the valve 69 will be held against its seat for preventing the oil from by-passing the filter units.

Suitable means are also provided for by-passing a portion of the oil around both the filter and the bearings. This is desirable especially when the oil is very thick and viscid, as when starting the engine during extremely cold weather. This is accomplished by providing a by-pass or passage 74 which may also be a portion of the bore 40, as shown in Fig. 4, and a conduit 75 leading back into the crank case. The by-pass 74 intercepts the conduit 75 and is provided with a valve 76 which is normally held against the seat by a spring 77 cooperating with a plug held in adjusted position by a cap and set nut similar to that already described.

Under the normal operation of the engine, oil will pass from the pump 13 through the pump discharge conduits 66, filter intake conduit 65 and intake passage 22 of the filter block to the filter units, and from those units back through the filter discharge passages 23 and 64, and the conduit 67 leading to the bearings. When the pressure in the intake passage exceeds a predetermined amount, the valve 69 will open and permit a portion or all of the oil to by-pass the filter units.

A further increase of the pressure in the passage 22 will cause the valve 76 to open and permit a portion of the oil to by-pass both the filter and bearings.

In the normal operation of the device the valve member 25 is in the position shown in Fig. 3. In this position the plug 33 is at the limit of its inward travel and the enlarged portions 27 and 28 of the valve member are in such position that the oil from the intake 22 will pass upwardly through the passage 36 into the casing 41 (see Fig. 3) exteriorly of the filter element 30. After passing through the filter, it enters the tube 39 through the openings 57 and is then discharged through the passages 38, 23 and 64 (see Figs. 3 and 4) into the conduit 67 and from thence to the bearings in the usual manner.

When it is desired to clean one of the filter units, the plug 33 beneath that unit is unscrewed to the position shown in either Fig. 6 or 8 for causing a reverse flow of the oil through the filter unit. In the position shown in Fig. 6, the intake passage 22 is closed for that unit, but since the discharge passage 23 is not closed, the filtered oil discharged from the other filter will back up through the passage 23 and tube 39 and flow in a reverse direction through the filter material, thereby loosening the sludge, washing the same down the exterior of the filter element into the oil sump 34 and since at this time the plug is far enough out to open the sump passage, the oil and sludge will pass outwardly from the filter block through the sump discharge passage 34. If, however, it is desired to reverse the flow of unfiltered oil through the filter unit, as when the filter is cleaned immediately after the oil in the crank case has been changed, the plug 33 is unscrewed to the position shown in Fig. 8 whereupon the unfiltered oil will pass in reverse direction through the filter element and will be discharged from the filter through the discharge opening 34. In either case, after the filter element has been properly flushed by the clean oil, the plug 33 may be unscrewed to the position shown in Fig. 7 and the valve 61 opened to permit the entrance of air whereby the oil will readily drain from the casing. After the oil has drained out, the plug 33 may be turned back to the operative position shown in Fig. 3 and after the unit is filled with oil, the valve 61 may be closed.

Suitable means are provided for indicating the position of the valve member 25. As shown, a plate 78 is secured to the filter block 14 and extends outwardly therefrom and is provided with legends 81, 82 and 83 and with corresponding graduations 84 thereon. The plug 33 is provided with a disk 85 for indicating the position of the plug and, incidentally, the valve. When the disk is at the line marked A, the valve is in the position shown in Fig. 6; when at B, it is in the position shown in Fig. 7; and when at C, it is in the position shown in Fig. 8.

In Fig. 9 is shown a modified form of one of the filter units. In this form of construction, the casing 41 is clamped in position by a cap nut 86 having an axial bore 87 which is closed by a cap element 88 threaded on the upper end of the cap 86. The filter element differs from that disclosed in Fig. 3 in that it comprises a drum 89 which is surrounded by an envelope of fibrous material, such as Canton flannel or the like 91. The drum 89 comprises the heads 92 and 93, each of which is provided with an annular recess 94 for receiving the ends of a cylindrical filter element 95 of foraminous or reticulated material. The envelope of fibrous material 91 has its ends extended beyond the cylinder and clamped about the tube 39 above and below the heads 92 and 93. The ends of the envelope 91 are held clamped to the tube 39 in any suitable manner, as by means of wires 96 and 97. The filter unit may be cleaned in the same manner as described above. In both forms of the device, the cap nut is threaded at its upper end whereby a hose may be attached for supplying the interior of the filter units with an extraneous fluid for cleaning or for assisting in cleaning the same. Since the remaining part of the filter unit is substantially the same as that already described, it is not thought necessary to further illustrate or describe the same.

If desired, the device may be used for filtering fuel supplied to the engine. The filter is especially adapted for filtering the fuel supplied to the fuel distributing mechanism for Diesel engines. As shown, more or less diagrammatically in Fig. 10, the filter mechanism 25 is interposed between the fuel tank 98 and the fuel distributing mechanism 99. The fuel is supplied to the filter mechanism from the reservoir 98 by a pump 101 which pumps fuel from the reservoir and forces it through a conduit 102 which is connected with one end of the intake passage 22 of the filter mechanism. The fuel after passing through the filter is forced through the discharge passage 23 into a discharge conduit 103 connected to the opposite end of the passage 23 and discharged into the distributing pump mechanism 99. The pump distributing mechanism supplies intermittently individual charges to the cylinders through the fuel conduits 104 in the usual manner. In the conventional operation of Diesel engines, the fuel distributing mechanism 99 supplies fuel in individual or separate charges to the conduits 104 intermittently and, consequently, this intermittent action has a tendency to cause "hammering" which, unless "cushioned", will tend to rupture the pipes or conduits supplying the fuel. In order to cushion this hammering action, due to this intermittent movement of the fuel through the fuel distributing tubes, a predetermined amount of air is trapped in the upper portion of the casing 41, as described above.

The amount of air trapped in the upper portion of the casing will depend on the position of the uppermost hole 57 in the pipe 39. As shown, this hole is adjacent to the upper portion of the filter element in order that when the valve 61 is opened or the cap 88 removed, as the case may be, air within the casing below the hole 57 will be permitted to escape when the casing is filled with liquid. The amount of air trapped above the hole 57 will function as a cushion for preventing "hammering".

It will thus be seen that by the use of a plurality of filter units, together with the mechanism described above any one of the filters may be thoroughly cleaned without materially interfering with the filtering operation of the unit or units not being cleaned. It will also be seen that the entire filter casing and unit may be removed for replacement or repair and that by operating the valves 25 and 60 the filters may be thoroughly cleaned, provided with sufficient air to prevent "hammering" within the filter system and the unit restored to operation without interfering with the operation of the engine in connection with which the filter is used.

It will be further noted that when the filter is installed as shown in Fig. 10 the normal liquid level in the filters is above the fuel pump outlet connections. The filter casing thus becomes a reservoir for supplying clean fuel under pressure while the engine is operating or a gravity head while the engine is stopped to fill the pump at any time without danger of air lock in the lines or pump.

It is thought from the foregoing taken in connection with the accompanying drawings that the construction and operation of my device will be apparent to those skilled in the art and that changes in size, shape, proportion and details of construction may be made without departing from the spirit and scope of the appended claims.

This application is a continuation in part of my application, Serial No. 680,735, filed July 17, 1933, for Filters.

I claim as my invention:—

1. In a fuel feeding system for an internal combustion engine of the Diesel type, a distributor for said engine, a plurality of filter units for supplying fuel to said distributor, main intake and discharge passages extending longitudinally beneath said filters, a horizontally arranged auxiliary passage beneath each filter in communication with said main passages and with said filters and a valve in each auxiliary passage for opening and closing said filters to said main intake, said valves being independently adjustable and movable to a position for causing filtered fuel from one of said units to flow in a reverse direction through another of said units for cleaning the same, and a chamber within each of said units communicating with said passages and adapted to contain a body of air to provide a cushion for preventing hammering within said passage.

2. In a filtering system for an internal combustion engine of the Diesel type, distributor mechanism for supplying charges of fuel to the cylinder of said engine, a pair of filter units, a pipe for conducting fuel from said units to said distributor mechanism, a base for supporting said units, intake and discharge passages for said units, within said base, said passages extending beneath said units, means for closing the intake of one of said units and for placing said unit in communication with the discharge passage from the other unit, whereby filtered liquid from said other unit may circulate in reverse direction through said one unit, means for closing both intake and discharge passages of the last named unit and means for releasing the liquid contained in the unit after its intake and discharge have been closed, and a chamber within each of said units communicating with said passages and adapted to contain a body of air above the fuel in the units for cushioning the hammering of said fuel in said pipe.

3. In combination, a Diesel engine, having a plurality of cylinders, a fuel distributor for delivering intermittent charges of fuel to said cylinders, a base, a plurality of filter units mounted on said base, common intake and discharge passages for said units within said base, means within said base for intercepting the flow of said fluid to and from one of said units without affecting the flow of said fluid through another of said units, means for introducing air into the one unit whereby the same may be cleaned during the operation of the engine, and a chamber within each of said units communicating with said passages and adapted to contain a body of air constituting an air cushion therein.

4. In an internal combustion engine, a filter block associated with the engine, said block having a main intake passage, a main discharge passage, a plurality of filters mounted on the block, said block having a transverse bore for each filter, each bore being in communication with said main intake and discharge passages, a sump in said block having an outlet, a plug for said outlet, an intake and a discharge passage for each filter in communication with said bore, and a valve in each of said bores, each valve having a plurality of enlarged cylindrical portions so spaced relatively to said passages that when the valve is in one position said main and filter intake passages are in communication with each other and said main and filter discharge passages are in communication with each other, and when the valve is in a second position the main and filter discharge passages are in communication with each other and said main and filter intake passages are out of communication with each other, and when said valve is in a third position said main intake passage is in communication with said filter discharge passage and said main discharge passage is out of communication with said filter intake passage.

5. In a filter system for internal combustion engines, a plurality of filter units, a common intake passage for said units, a common discharge passage for said units, intake and discharge conduits for each of said units, a sump in each unit, each sump having an outlet, a threaded plug for each outlet, a transverse bore for each unit, each bore being in communication with said passages and conduits, a valve member within said bore, a spring for normally urging said valve member outwardly against said plug, and a plurality of enlargements on said valve member so spaced and of such widths that when the plug is in position to close the sump the common intake passage and the unit intake conduit are in communication with each other and the common discharge passage and the unit discharge conduit are in communication with each other, and when the plug is unscrewed to a second position to open the sump outlet the common discharge passage and the unit discharge conduit are in communication with each other and the common intake passage and the unit intake conduit are out of communication with each other, and when the plug is further unscrewed to a third position the sump outlet is open, the common intake passage is in communication with the unit discharge conduit, and the common discharge passage is out of communication with the unit intake conduit.

6. In an oil filter system for internal combustion engines, a plurality of filter units, a common oil intake passage for all of said units, a common oil discharge passage for all of said units, an intake passage and a discharge passage for each filter, valve means for each filter controlling communication between the intake and discharge passages of each filter and said common intake and discharge passages, said valve means when in one position connecting said common intake passage and said filter intake passage and in the same position connecting said common discharge passage and said filter discharge passage, said valve when in a second position connecting said common discharge passage with said filter discharge passage and closing communication between said common intake passage and said filter intake passage, and in a third position connecting said common intake passage and said filter discharge passage and closing communication between said common discharge passage and said filter intake passage, and a valve-controlled outlet in communication with the intake side of the filter unit.

CHARLES A. WINSLOW.